United States Patent
Naphade et al.

(10) Patent No.: US 9,976,592 B2
(45) Date of Patent: May 22, 2018

(54) AUTOMATIC TRANSMISSION SHIFT CABLE CLIP

(71) Applicant: FORD GLOBAL TECHNOLOGIES, LLC, Dearborn, MI (US)

(72) Inventors: Mayuri Naphade, Westland, MI (US); Shailesh Patke, West Bloomfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 105 days.

(21) Appl. No.: 14/837,374

(22) Filed: Aug. 27, 2015

(65) Prior Publication Data
US 2017/0058938 A1    Mar. 2, 2017

(51) Int. Cl.
| F16C 1/10 | (2006.01) |
| F16H 61/36 | (2006.01) |
| F16B 2/20 | (2006.01) |
| F16H 59/10 | (2006.01) |

(52) U.S. Cl.
CPC .......... F16C 1/102 (2013.01); F16H 61/36 (2013.01); F16B 2/20 (2013.01); F16H 59/10 (2013.01)

(58) Field of Classification Search
USPC ..... 248/229.24, 230.5, 230.6, 230.7, 49, 65, 248/67.7, 74.1, 74.4, 229.25, 229.26
See application file for complete search history.

(56) References Cited

U.S. PATENT DOCUMENTS

| 5,417,126 | A | 5/1995 | Decrouppe et al. |
| 5,598,743 | A * | 2/1997 | Yasuda ..................... F16C 1/14 403/11 |
| 5,662,004 | A | 9/1997 | Osborn et al. |
| 6,152,412 | A * | 11/2000 | Basickes ................. F16L 3/127 248/317 |
| 7,029,194 | B2 | 4/2006 | Ishikawa et al. |
| 7,494,441 | B2 | 2/2009 | Haefner |
| 8,560,193 | B2 | 10/2013 | Krishnaswami et al. |
| 8,919,707 | B2 | 12/2014 | Lee et al. |
| 2005/0061925 | A1* | 3/2005 | Kirschner ............. F16L 3/1016 248/49 |
| 2009/0127407 | A1* | 5/2009 | Pothanikat ............ F16L 59/135 248/74.1 |
| 2009/0266944 | A1* | 10/2009 | Mominee .............. F16L 3/1016 248/67.7 |
| 2010/0236116 | A1* | 9/2010 | Gimpel ................... G09F 13/04 40/606.03 |
| 2011/0148734 | A1* | 6/2011 | An ....................... H01Q 1/2266 343/873 |
| 2011/0278402 | A1* | 11/2011 | Birch .................... F16L 3/1016 248/74.4 |
| 2013/0118627 | A1* | 5/2013 | Utay ..................... F16L 55/035 138/106 |

(Continued)

FOREIGN PATENT DOCUMENTS

KR    20060071806 A    6/2006

Primary Examiner — Alfred Wujciak
(74) Attorney, Agent, or Firm — James Dottavio; MacMillan, Sobanski & Todd, LLC (57) ABSTRACT

A shift cable clip for use in automatic transmission vehicles is described. In some embodiments, two clip segments encircle a circumference of a transmission shift-cable conduit end-fitting and attach to a transmission housing. Embodiments of the invention are lightweight, durable, efficient to manufacture, and labor-saving to install.

17 Claims, 5 Drawing Sheets

(56) References Cited

U.S. PATENT DOCUMENTS

| | | | |
|---|---|---|---|
| 2013/0283956 A1 | 10/2013 | Grifka | |
| 2014/0166824 A1* | 6/2014 | Tarapchak | F16L 3/20 248/49 |
| 2014/0346291 A1* | 11/2014 | Booth | H02G 7/053 248/74.4 |
| 2016/0047496 A1* | 2/2016 | O'Connell | F16L 59/16 248/72 |
| 2016/0116083 A1* | 4/2016 | Olsen | F16B 2/06 248/74.1 |

* cited by examiner

AUTOMATIC TRANSMISSION SHIFT CABLE CLIP

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to automotive transmission external control assemblies, and, more specifically, to transmission shift cable clips for automatic transmissions.

A transmission shifter assembly translates user commands for operational mode to the transmission. With many systems, a user moves a mode selection lever or shifter to a position that correlates with a transmission mode of operation (e.g., park reverse ("R"), neutral ("N"), drive ("D"), and low drive ("L/M")). Positioning the shifter communicates by a push-pull control mechanism to move a rotor shaft and lever on the transmission. The control mechanism generally includes a sheathed cable secured at an anchor point between the shifter and the transmission. Many assemblies utilize a Bowden cable between the shifter and a securing structure at an anchor point on the transmission housing, and use a telescoping rod between the securing structure and a lever turning the transmission rotor shaft.

The securing structure is generally located on or near the transmission housing, in an area of the vehicle with tight clearances. The securing structure placement, relative to the rotor lever, is important to facilitate smooth and even movement of the shifter.

A typical automatic transmission shift cable securing structure utilizes a metal bracket, a mating fastener, and an assortment of screws. There may be multiple parts requiring proper alignment and attachment to each other, to the cable, and to the anchor point. The fastener and metal bracket may be relatively heavy, difficult to install, operable in limited orientations, and bulky within the spatial limitations for a securing structure at the anchor point. Labor costs may be adversely impacted by the multiplicity of parts and tedious steps of placement and attachment during installation. Additionally, conventional modes of securing the transmission shift cable do not fully mitigate risks of incomplete attachment and improper installation.

Accordingly, there is a need for an automatic transmission shift cable securing structure that is compact, light, strong, uncomplicated, easy to install, and cost effective to manufacture.

SUMMARY OF THE INVENTION

The present invention may address one or more of the above-mentioned issues. Other features or advantages may become apparent from the description which follows.

An embodiment of a transmission cable clip for securing a connector for a transmission shift-cable conduit end-fitting is described comprising: a first and a second segment, each segment having a pair of mounting wings, each wing defining a first and a second mounting hole therethrough; a bridge connecting the mounting wings and having a surface configured to seat a circumferential segment of the connector, whereby the bridge of the first and second segments substantially encircle the connector; and wherein the clip is configured to attach the connector, the first segment, and the second segment to an anchor point adjacent a transmission rotor shaft.

In some embodiments, the first mounting hole on the first segment further comprises a flanged aperture having a flange ringing the first mounting hole on an inner surface of the mounting wing, whereby the flange is configured to seat within a simple aperture of a mounting hole of the second segment.

In some embodiments, the first clip segment is the same shape as the second clip segment.

In some embodiments, a clip may further comprise: a rivet connecting the mounting wing of the first clip segment to the second clip segment.

In some embodiments, a clip may comprise: first and second clip segments die-cast from a zinc alloy.

An embodiment of a transmission cable clip segment is described comprising: a bridge having a concave surface configured to seat a circumferential segment of a transmission shift cable conduit end fitting connector; a first mounting wing at a first base of the bridge, defining a substantially planar surface and a mounting hole therethrough; a second mounting wing opposite the first mounting wing at a second base of the bridge defining a substantially planar surface and a mounting hole therethrough.

In some embodiments, a clip segment may further comprise: a flange at a rim of the mounting hole of the first mounting wing, wherein the substantially planar surface of the first mounting wing has an inner side substantially contiguous with the concave surface of the bridge, and wherein the flange is at the inner surface of the mounting wing.

In some embodiments, a clip segment may further comprise: a flange at a rim of the mounting hole of the first mounting wing, wherein the substantially planar surface of the first mounting wing has an inner side substantially contiguous with the concave surface of the bridge, and wherein the flange is at the inner surface of the mounting wing, and wherein the flange is configured to seat within a simple aperture of a mating clip segment; and a simple aperture at the mounting hole of the second mounting wing, wherein the simple aperture is configured to seat a flange of a mating clip segment.

Described herein is a method for securing a transmission shift-cable conduit end-fitting connector to a transmission housing, comprising: providing cable clip having a first and a second segment, each segment having a pair of mounting wings, each wing defining a first and a second mounting hole therethrough; and a bridge connecting the mounting wings and having a surface configured to seat a circumferential segment of the connector, whereby the bridge of the first and second segments substantially encircle the connector; seating a connector within the clip segments whereby the bridge of the first and second segments substantially encircle the connector; inserting a first fastener through the first mounting hole of the first segment, through the second mounting hole of the second segment, and into a fastening engagement on a first boss on the transmission housing; and inserting a second fastener through the second mounting hole of the first segment, through the first mounting hole of the second segment, and into a fastening engagement on a second boss on the transmission housing.

The invention will be explained in greater detail by way of example with reference to the figures, in which the same references numbers are used in the figures for identical or analogous elements. The above features and advantages and other features and advantages of the present invention are readily apparent from the following detailed description of the best modes for carrying out the invention when taken in connection with the accompanying drawings.

DETAILED DESCRIPTION OF PREFERRED EMBODIMENTS

A driver of an automatic transmission vehicle selects an operation mode for the transmission. For example, a five-position automatic transmission shift gate includes a shift path defined by five shift positions: park-reverse-neutral-drive-low/manual/sport (or "PRNDL"). A mode selection shifter may be located, for example, on a steering column, a vehicle console, or a floor.

The mode selection is mechanically or electro-mechanically communicated to a vehicle transmission. In a typical automatic transmission road vehicle, the communication occurs by a push-pull cable mechanism with a Bowden cable having a flexible core wire slidably enclosed within a flexible outer sheath or conduit. A conduit end fitting is at each end of the conduit, on the shifter side and the transmission side, and the core extends through the conduit end fittings. Exemplary methods for coupling a mode selector or shifter with a transmission shift cable are provided in U.S. Pat. No. 5,417,126, U.S. Pat. No. 7,494,441, and U.S. Pat. No. 8,560,193, each of which is incorporated by reference herein.

On the transmission side of a transmission shift cable, the conduit end fitting or an end fitting connector is attached at an anchor point on or adjacent to the transmission. In some designs, at or near the transmission end of the cable assembly, the core wire or cable attaches to a movable rod affixed at or adjacent the anchor point. The rod attaches to a swivel tube. The swivel tube attaches to a lever, such as a gear selector arm, which turns a rotor shaft exerting control over the transmission. Described herein are embodiments of a clip for attaching and securing an element of a transmission shift cable assembly at an anchor point.

Figure 1:
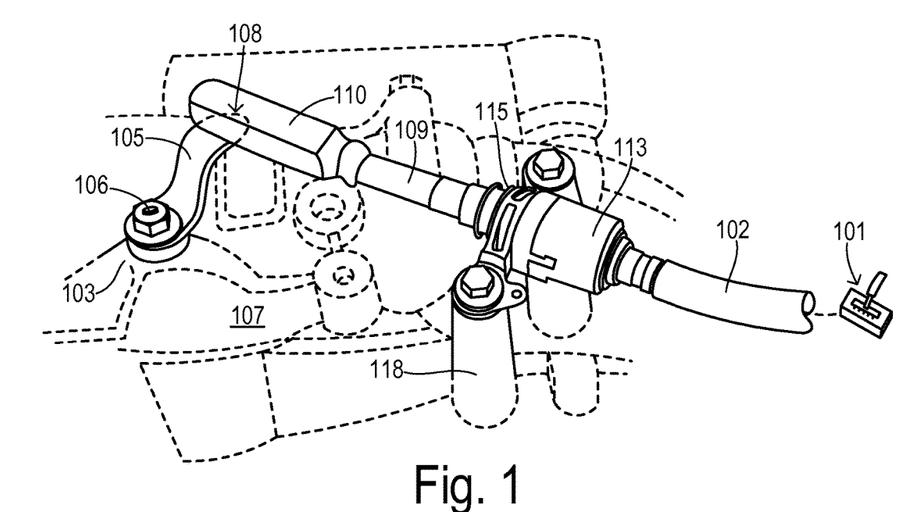
FIG. 1 is a perspective view of an installed automatic transmission shift cable clip.
Figure 2:
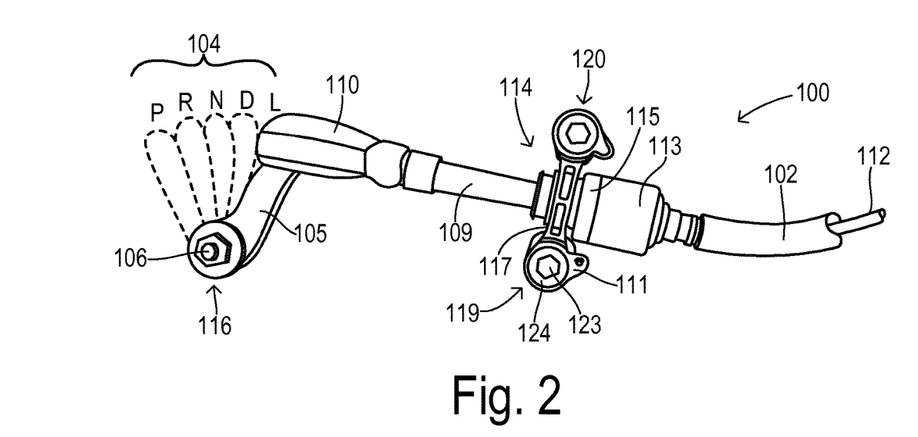
FIG. 2 is a top view of the installed automatic transmission shift cable clip.

Turning to FIGS. 1-2, a driver operates a shifter 101 to select a driving mode. A transmission shift cable assembly 100 transmits driver commands from the shifter 101, along a transmission shift cable or conduit 102, to the transmission 103.

The shifter 101 position corresponds to set positions 104 of a transmission rotor arm 105. The transmission rotor arm 105 is axially attached to, and pivots about, a rotor shaft 106 that passes through the transmission case 107 and into the transmission 103.

The rotor arm 105 is distally attached to a swivel joint 108. The swivel joint 108 attaches to a movable telescoping rod 109. The rod moves within a swivel tube 110. The rod 109 is pushed or pulled by a core wire 112 of the transmission shift cable 102. The swivel joint 108 transfers the linear, lengthwise forward and back movement of the rod 109 and tube 110 assembly into the rotating movement of the rotor arm 105. The rotor arm 105 turns the rotor shaft 106 as the telescoping rod 109 extends or retracts.

The telescoping rod 109 joins the core wire 112 at a conduit end fitting connector 115. The conduit end fitting connector 115 is located on the transmission side, at the conduit end fitting 113, of the transmission shift cable 102. A shifter-side conduit end, at or near a passenger compartment at the shifter side of the transmission shift cable 102, is not shown. The conduit end fitting connector 115 is secured by a transmission shift cable clip 111 affixed at an anchor point 114. The anchor point 114 and clip 111 are stationary relative to the pivot point 116 of the rotor shaft 106 connection to the rotor arm 105. The core wire 112 and rod 109 move relative to the clip 111 position.

The transmission shift cable clip 111 has two segments circumferentially encircling a collar or groove 117 of the conduit end fitting connector 115. The segments are attached by fasteners 123 and mounted on a pair of bosses 118 on the transmission case housing 107. Shown is a first attachment point 119 with a hex cap screw 123 and washer 124 affixing a first clip segment 121 and a second clip segment 122 to a raised boss 118 and a second attachment point 120 with a hex cap screw 123 and washer 124 affixing the first and second clip segments 121, 122 to another raised boss 118.

One advantage of attaching the clip to raised bosses is improved tool clearances for securing the fasteners and improved views for quality checks. Another advantage of attaching the clip to raised bosses is enhanced design flexibility in locating the attachment point. To avoid uneven "stickiness" in movement of the shifter, the set positions of the rotor lever must be coplanar, requiring good alignment between the location of the rotor shaft and the attachment point.

One advantage of attaching the clip with a pair of fasteners, particularly threaded fasteners, such as hex screws, is that the attachment can be standardized and calibrated, such as by using a calibrated torque wrench during installation. Also, it is readily apparent if one of the two screws is missing. Prior art securing methods include structures with numerous non-identical fasteners, such that a conduit end fitting connector could be held in place without securing all fasteners, leading to potential positioning error, break-away issues, and increased labor costs.

Another advantage of the described structures is that more space is available in the vehicle engine compartment, since the transmission shift cable clip is relatively compact.

Figure 3:
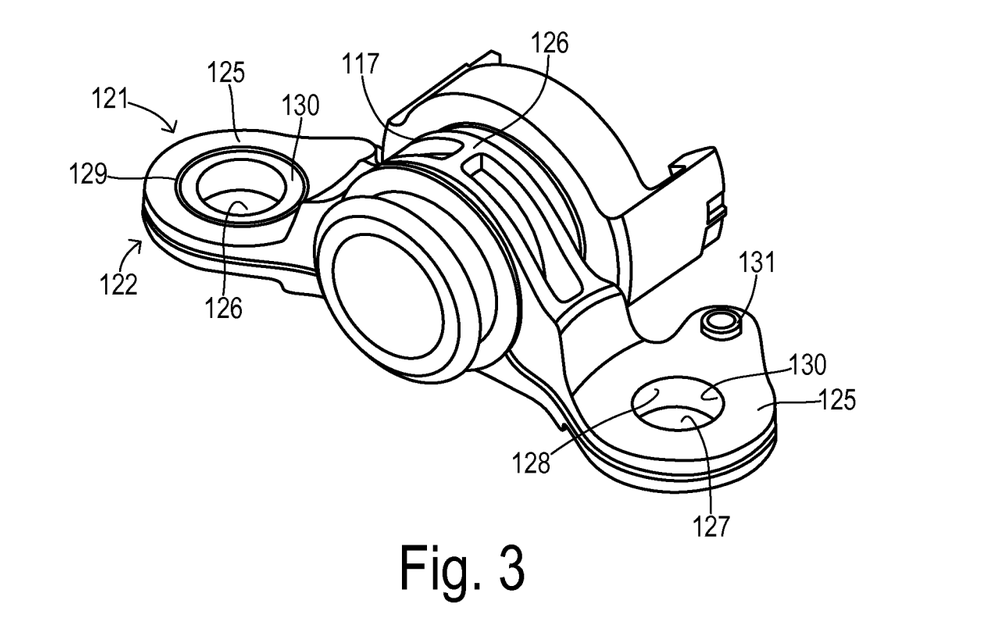
FIG. 3 is a perspective view showing one embodiment of a non-symmetrical transmission shift cable clip around a cable conduit end fitting connector.

Turning to FIG. 3, a non-symmetric transmission shift cable clip 111 is shown encircling a groove 117 in a conduit end fitting connector 115. The clip 111 has a first (e.g., upper) clip segment 121 and a second (e.g., lower) clip segment 122. Each clip segment has two mounting wings 125 connected by a bridge 126. An inner surface of the bridge 126 is configured to seat a circumferential segment of the conduit end fitting connector 115 within groove 117. An inner surface of the mounting wings 125 of the first clip segment 121 is configured to engage an inner surface of the mounting wings 125 of the second clip segment 122. Each mounting wing 125 defines an opening therethrough as a mounting hole 127. An upper, or outer, surface of the mounting wing 125 of the first clip segment 121 is configured to adjoin a fastener 123 at the mounting hole 125, such as a washer 124 and screw 123. A lower, or outer, surface of the second clip segment 122 is configured to engage or abut at least one affixing point, such as a boss 118 on a transmission housing 107 or other stable vehicle structure. The two mounting holes 125 of the first and second clip segments 121, 122 may comprise at least one flanged aperture 128 and at least one un-flanged simple aperture 129.

When the clip segments are aligned around the collar 117 of the cable connector 115, a lip or flange 130 along an inner diameter of the flanged aperture 128 on the first clip segment 121 engages an inner diameter of the simple aperture 129 on the second clip segment 122. Likewise, the flange around an inner diameter of the flanged aperture 128 on the second clip segment 122 engages an inner diameter of the simple aperture 129 on the first clip segment 121. The flanges 130 aid in proper positioning and in preventing lateral slippage.

In the embodiment shown, the flange 130 engagement terminus is substantially coplanar with the outer surface of the engaged mounting wing 125. The bridge 121 of the first clip segment 121 encircles more than half of the circumference of the collar 117, while the bridge 121 of the second clip segment 122 encircles the remaining circumference which is less than half of the collar 117 circumference. A plane, defined by the inner surface junction between the mounting wings 125, is offset from a center point of the collar 117. This dimensionality aids in designing a transmission with suitable part placement for tool clearance and accommodating other elements of the vehicle while still maintaining good alignment for smooth shifting.

Other orientations and configurations of the clip assembly are suitable for positioning and resisting slippage. For example, the first clip segment could have flanged apertures at both mounting holes engaged with the simple apertures of the mounting holes in the second clip segment. As another example the mounting holes could use other engagement structures, such as, but not limited to: notch and tooth engagement, partial ridge and groove engagement, outer diameter rim edging bands, and other configurations.

As shown on FIG. 3, a mounting wing 125 may further comprise a rivet 131 or other fastener connecting a mounting wing 125 of a first clip segment 121 with a mounting wing of a second clip segment 122. The rivets 131 hold the first and second clip segments 121, 122 in place around the conduit end fitting connector 115 without using the mounting holes 127. This is helpful during assembly and installation because the transmission shift cable clip 111 can be attached to the conduit assembly 100 before installation and can be easily held in position during installation. Partial pre-assembly can facilitate more efficient labor division, reduce risks of improper installation, and ensure that the proper parts are present prior to final installation.

Figure 4:
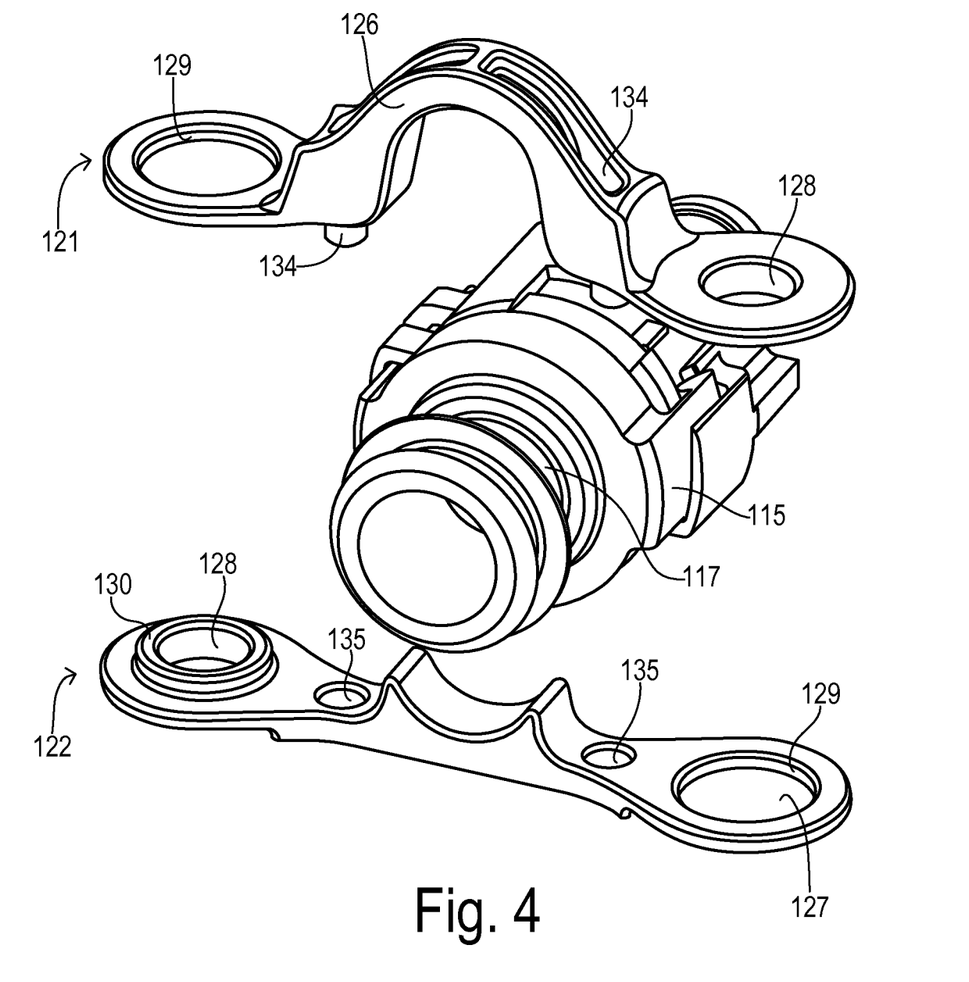
FIG. 4 is an exploded perspective view showing another embodiment of a non-symmetrical transmission shift cable clip and cable conduit end fitting connector.

FIG. 4 shows an exploded view of another embodiment of a non-symmetrical transmission shift cable clip 111. The first clip segment 121 and second clip segment 122 substantially encircle the conduit end fitting connector 115 at the groove or collar 117. In the depicted embodiment, a fastener hole 135 and sleeve 134 are located where the bridge 126 meets the mounting wings 125. As in the previously discussed embodiment, rivets or other fasteners can be used to attach the clip 111 around the conduit end fitting connector 115 prior to final installation. As in FIG. 3, the clip of FIG. 4 is mounted to the vehicle transmission housing by mounting holes 127. The flange 130 of the flanged aperture 128 on the top or first clip segment 121 seats into the simple aperture 129 on the bottom or second clip segment 122 and, conversely, the flange 130 of the flanged aperture 128 on the bottom or second clip segment 122 seats into the simple aperture 129 on the top or first clip segment 121.

Figure 5:
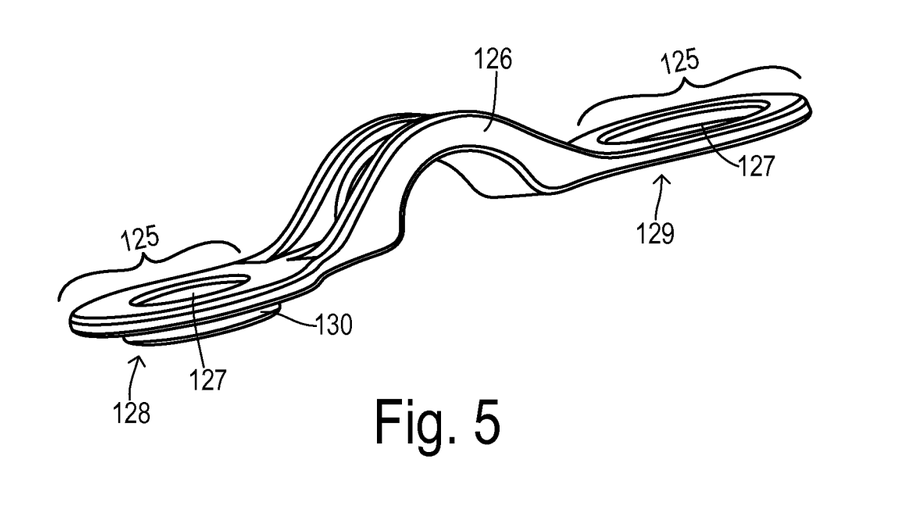
FIG. 5 is a perspective view showing one embodiment of a symmetrical transmission shift cable clip segment.
Figure 6:
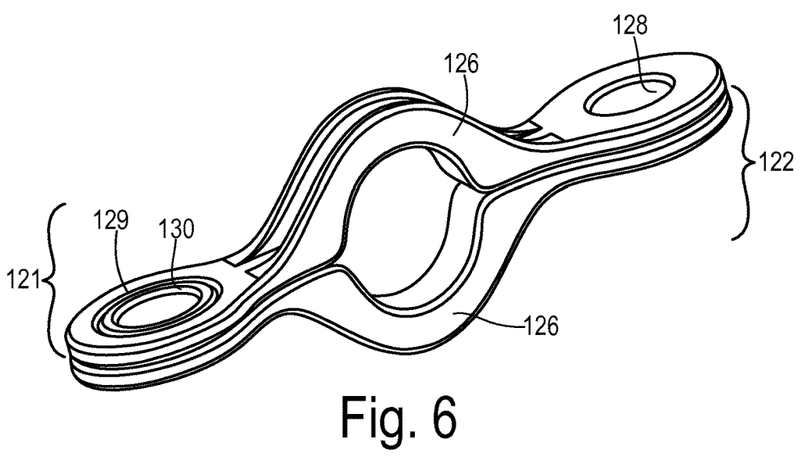
FIG. 6 is a perspective view showing the symmetrical transmission shift cable clip segments of FIG. 5 as a mated pair.
Figure 7:
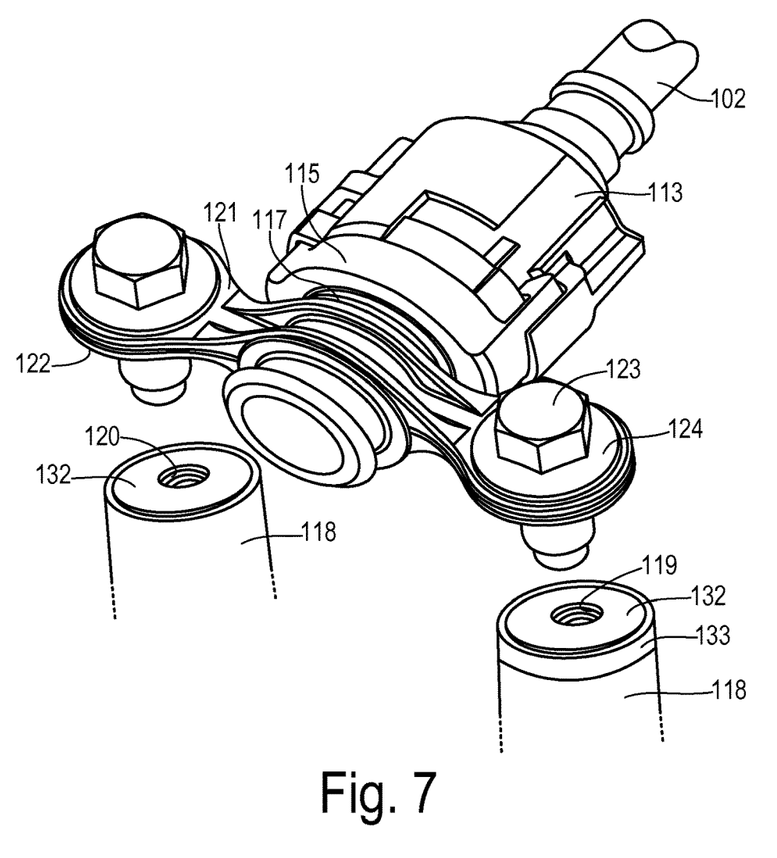
FIG. 7 is a perspective view showing an embodiment of a symmetrical transmission shift cable clip around a cable conduit end fitting connector.

Turning now to FIGS. 5-7, a clip 111 with symmetrical segments is shown. In this embodiment, the shape of the first clip segment 121 is identical or substantially identical to the second clip segment 122. Each clip segment has two mounting wings 125 connected by a bridge 126. An inner surface of the bridge 126 is configured to seat a circumferential segment of the conduit end fitting connector 115. An inner surface of the mounting wings 125 of the first clip segment 121 is configured to engage and lay flush against an inner surface of the mounting wings 125 of the second clip segment 122. Each mounting wing 125 defines an opening therethrough as a mounting hole 127. An upper, or outer, surface of the mounting wing 125 of the first clip segment 121 is configured to adjoin a fastener 123 at the mounting hole 127, such as a washer 124 and screw 123. A lower, or outer, surface of the second clip segment 122 is configured to engage or abut at least one affixing point, such as a boss 118 on the transmission housing 107. Also shown is a vibration damping gasket 132 for placement between the boss 118 and the clip 111 in some embodiments. The two mounting holes 125 of the first and second clip segments 121, 122 may comprise at least one flanged aperture 128 and at least one un-flanged simple aperture 129.

When the clip segments are aligned around the collar 117 of the cable connector 115, a lip or flange 130 along an inner diameter of the flanged aperture 128 on the first clip segment 121 engages an inner diameter of the simple aperture 129 on the second clip segment 122. The flange 130 seats within the simple aperture 129. Likewise, the flange 130 around an inner diameter of the flanged aperture 128 on the second clip segment 122 engages an inner diameter of the simple aperture 129 on the first clip segment 121. The first clip segment 121 is positioned flush with the second clip segment 122 to circumferentially encircle a collar or groove of the conduit end fitting connector.

In the symmetrical embodiment, the inner surfaces of the mated mounting wings 125 are aligned along a plane crossing through a center axis of the conduit 102.

In some embodiments, an offset spacer 133 may be installed between the clip 111 and boss 118. An offset spacer 133 between the lower outer surface of the mounting wing 125 of the second clip segment 122 may be used to adjust the height or distance of the clip 111 from the boss 118. This can be used to compensate for dimensional variation. In some embodiments, the clip is assembled into a kit with fasteners. In some embodiments, the kit includes at least one offset spacer. In some embodiments, the kit includes a plurality of offset spacers of varying thickness. In some embodiments, the thickness of the offset spacer is between 0.5 mm and 15.0 mm.

One advantage of the symmetrical embodiment is reduced complexity and a concomitant reduction in the risk of installation error. Improper installation orientation of a symmetrical embodiment is physically impossible as the attachment points are interchangeable.

Another advantage is parts management efficiency improvements. For example, rather than stocking and inventorying two clip segments having different characteristics and part numbers, a single part can be stocked. This also ensures that whenever at least two units are in stock, a corresponding mating segment is available.

Yet another improvement is reduced manufacturing costs. Tooling can be a significant cost in parts manufacture. A symmetrical transmission shift cable clip has identical first and second clip segments, eliminating the need for a second molding or casting tool, thereby reducing tooling costs.

Figure 8:
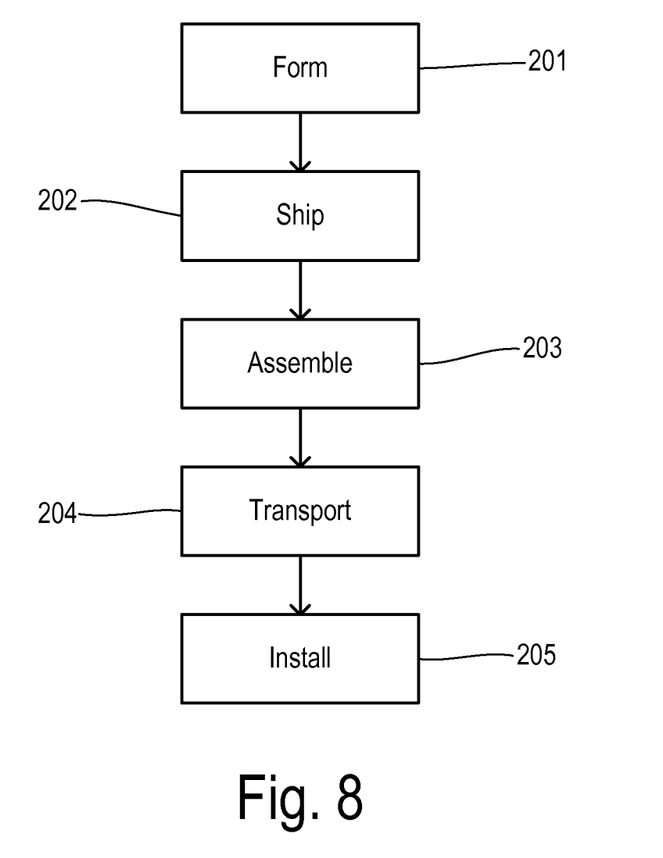
FIG. 8 is a flow chart showing a method of making, assembling, installing, and using an embodiment of a transmission shift cable clip.

FIG. 8 shows a flow chart of steps for making, assembling, and installing an exemplary embodiment of the transmission shift cable clip. It will be understood that this is an example and many of the steps may be performed separately, non-sequentially, and/or by alternate methods.

The cable clip segments are formed 201. In an embodiment, the segments are formed by die casting a zinc alloy, such as zamac 3. This method has the advantage of forming a clip that is strong, stiff, lightweight, and corrosion-resistant. In particular embodiments the clip has a weight of 30-45 grams, less than a quarter of the weight of a conventional bracket assembly. In particular embodiments, the clip assembly, including all fasteners and attachment fittings for connecting the clip to the cable conduit connector and transmission housing, has a weight of 30-100 grams.

An embodiment of a clip segment has a bridge and pair of mounting wings that are connected, or formed as a single unit of a stiff, substantially non-deformable material.

Other suitable formation methods and materials may be selected to meet suitable design parameters. Parameters to consider include: durability, strength, weight, compressibility and bending resistance, resistance to corrosion, and heat tolerance. Other suitable methods may include, for example, injection molding a fiber reinforced composite, casting other metal alloys, or 3D printing.

The cable clip segments are shipped 202 from a formation location to an assembly location. The cable clip segments are assembled 203 into a pre-assembly package with the cable conduit. The pre-assembly package is transported 204 to an installation area. The pre-assembly package may consist essentially of: a cable conduit; conduit end fittings at each end of the conduit; connectors at the end fittings; and a cable clip assembly having two clip segments coupled together around a groove in the conduit end fitting connector.

The cable clip segments are installed 205 into the vehicle by securing the cable clip assembly at an anchor point adjacent to the transmission rotor shaft. In some embodiments, a calibrated torque wrench is used in securing a bolt, screw, or other hardware extending through the mounting holes of the clip assembly to a pair of bosses on the transmission housing. In some embodiments, adjustments in an attachment height are made by installing an offset spacer between a fastening engagement of the boss and a facing mounting wing surface of the clip.

While specific examples have been described with particular structures, it is understood that permutations, additions, and substitutions may be made. For example, when a specific fastener is described, other suitable fasteners or means for attaching and securing may be used including, but not limited to, bolts, screws, rivets, brads, ties, pins, hooks, latches, bands, cables, welding, adhesives, slots, clips, and clamps. Structures may be oriented in different positions to perform an equivalent function, such as reversing elements of mated components. Structures and treatments may be added to the transmission shift cable assembly or to the clip assembly, such as heat shielding, structural ribbing, positioning grooves, vibrational cushioning, compression padding, gaskets, anticorrosion coating, paint, embossing, texturing, or other elements, without deviating from the scope of the disclosure. As another example, when a specific material is described, other suitable materials may be used including, for example, fiber-reinforced composites and metal alloys.

It is to be understood that positional references, such as top, bottom, upper, and lower, are made for ease of explanation and to describe relative position only. Such terms do not specify positional relationships to the vehicle or environment unless explicitly stated.

Although the detailed description makes reference to illustrative embodiments, many alternatives, modifications, and variations thereof will be apparent to those skilled in the art. Accordingly, it is intended that the claimed subject matter be viewed broadly.

What is claimed is:

1. A motor vehicle automatic transmission cable clip for securing a connector for a transmission shift-cable conduit end-fitting comprising:
    a first and a second segment, each segment having
        a pair of mounting wings, each wing defining a mounting hole therethrough, forming a first mounting hole and a second mounting hole in the segment;
        a bridge connecting the mounting wings and having a surface configured to seat a circumferential segment of the connector, whereby the bridge of the first and second segments are configured to substantially encircle the connector to fix the end-fitting against relative movement; and
    a first mounting fastener securing the clip through the first mounting hole in the first segment and the second mounting hole in the second segment, to attach at an anchor point adjacent a motor vehicle automatic transmission rotor shaft; and
    a second mounting fastener securing the clip, through the second mounting hole in the first segment and the first mounting hole in the second segment to attach at the anchor point;
whereby the clip is configured to attach the connector, the first segment, and the second segment to the anchor point.

2. The clip of claim 1, wherein the first mounting hole on the first segment further comprises a flanged aperture having a flange ringing the first mounting hole on an inner surface of the mounting wing, whereby the flange is configured to seat within a simple aperture of a mounting hole of the second segment, and wherein the first clip segment is the same shape as the second clip segment.

3. The clip of claim 1, wherein the first clip segment is the same shape as the second clip segment.

4. The clip of claim 1,
    wherein the anchor point further comprises a first attachment point at a first raised boss, and a second attachment point at a second raised boss; and
    wherein the first mounting fastener extends through the first mounting hole in the first segment and through the second mounting hole in the second segment to attach at the first raised boss; and the second mounting fastener extends through the second mounting hole in the first segment and through the first mounting hole in the second segment to attach at the second raised boss.

5. The clip of claim 1, further comprising: a connector fastener extending through the mounting wing of the first segment and through the mounting wing of the second segment thereby connecting the first clip segment to the second clip segment.

6. The clip of claim 1, wherein the first and second clip segments are die-cast from a zinc alloy.

7. The clip of claim 1, wherein the clip has a weight of 30-45 grams.

8. The clip of claim 1, wherein the first mounting fastener is threaded.

9. A motor vehicle automatic transmission cable clip segment comprising:
- a bridge having a concave surface configured to seat a circumferential segment of a transmission shift cable conduit end fitting connector;
- a first mounting wing at a first base of the bridge, defining a substantially planar surface and a first mounting hole therethrough;
- a second mounting wing opposite the first mounting wing at a second base of the bridge defining a substantially planar surface and a second mounting hole therethrough; the first and second mounting wings shaped to engage the first and second mounting holes with at least one affixing element on a motor vehicle automatic transmission housing for securing the cable clip segment at the first and second mounting holes; and
- wherein the clip segment further comprising a flange at a rim of the mounting hole of the first mounting wing, wherein the substantially planar surface of the first mounting wing has an inner side substantially contiguous with the concave surface of the bridge, and wherein the flange is at the inner surface of the mounting wing.

10. The transmission cable clip segment of claim 9 further comprising:
- a flange at a rim of the mounting hole of the first mounting wing, wherein the substantially planar surface of the first mounting wing has an inner side substantially contiguous with the concave surface of the bridge, and wherein the flange is at the inner surface of the mounting wing, and wherein the flange is configured to seat within a simple aperture of a mating clip segment; and
- a simple aperture at the mounting hole of the second mounting wing, wherein the simple aperture is configured to seat a flange of a mating clip segment.

11. The transmission cable clip segment of claim 9, wherein the cable clip segment is metal.

12. The transmission cable clip segment of claim 9, wherein the cable clip segment is die-cast from a zinc alloy.

13. A motor vehicle automatic transmission cable clip comprising:
- a first and a second segment, the first segment comprising:
    - a first mounting wing defining a first mounting hole with a flanged rim on an inner surface of the mounting wing;
    - a second mounting wing defining a second mounting hole configured to seat the flange of the second segment; and
    - a bridge connecting the first and second mounting wings of the first segment, the bridge having a surface configured to seat about half of a circumference of a collar;
- the second segment having the same shape as the first segment;
- a first fastener securing the first mounting wing of the first segment and the second mounting wing of the second segment to a first attachment point of a motor vehicle automatic transmission housing; and
- a second fastener securing the second mounting wing of the first segment and the first mounting wing of the second segment to a second attachment point of the motor vehicle automatic transmission housing.

14. The clip of claim 13,
wherein the collar encircles an automatic transmission shift-cable conduit end-fitting;
wherein the first attachment point and the second attachment point are stable, relative to the motor vehicle automatic transmission housing, and relative to a pivot point of a rotor shaft connection to a transmission rotor arm; and
wherein the bridge of the first and second segments are configured to substantially encircle the collar, thereby securing the end-fitting against movement relative to the pivot point.

15. A motor vehicle automatic transmission shift cable assembly comprising:
- a motor vehicle automatic transmission clip comprising:
    - a first and a second segment, the first segment comprising:
        - a first mounting wing defining a first mounting hole with a flanged rim on an inner surface of the mounting wing;
        - a second mounting wing defining a second mounting hole configured to seat the flange of the second segment; and
        - a bridge connecting the first and second mounting wings of the first segment, the bridge having a surface configured to seat about half of a circumference of a collar of a transmission shift-cable conduit end-fitting;
    - the second segment having the same shape as the first segment;
    - a first fastener securing the first mounting wing of the first segment and the second mounting wing of the second segment to a first attachment point of a motor vehicle automatic transmission housing, wherein the first attachment point is a first raised boss; and
    - a second fastener securing the second mounting wing of the first segment and the first mounting wing of the second segment to a second attachment point of the motor vehicle automatic transmission housing.

16. The motor vehicle transmission shift cable assembly of claim 15, further comprising an offset spacer between the first raised boss and an outer surface of the second mounting wing of the second segment.

17. The motor vehicle transmission shift cable assembly of claim 16, wherein the offset spacer has a thickness between 0.5 mm and 15.0 mm.

\* \* \* \* \*